(12) United States Patent
Shin et al.

(10) Patent No.: US 7,716,422 B2
(45) Date of Patent: May 11, 2010

(54) STORAGE APPARATUS AND METHOD FOR USING A NON-VOLATILE CACHE MEMORY ORGANIZED INTO STATIONARY AND NON-STATIONARY CIRCULAR REGIONS

(75) Inventors: Dong-kun Shin, Seoul (KR); Sang-lyul Min, Seoul (KR); Shea-yun Lee, Seoul (KR); Jang-hwan Kim, Suwon-si (KR); Dong-hyun Song, Yongin-si (KR); Jeong-eun Kim, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 673 days.

(21) Appl. No.: 11/601,820

(22) Filed: Nov. 20, 2006

(65) Prior Publication Data

US 2007/0150647 A1    Jun. 28, 2007

(30) Foreign Application Priority Data

Dec. 27, 2005    (KR) .................. 10-2005-0130822

(51) Int. Cl.
    *G06F 12/00* (2006.01)
(52) U.S. Cl. ...................................... 711/129; 711/173
(58) Field of Classification Search ................. 711/103, 711/173, 129
    See application file for complete search history.

(56) References Cited

U.S. PATENT DOCUMENTS

| | | | |
|---|---|---|---|
| 5,414,826 A | 5/1995 | Garcia | |
| 6,035,347 A * | 3/2000 | Beardsley et al. | 710/52 |
| 6,725,342 B1 | 4/2004 | Coulson | |
| 6,745,283 B1 * | 6/2004 | Dang | 711/113 |
| 6,785,767 B2 | 8/2004 | Coulson | |
| 7,366,842 B1 * | 4/2008 | Acocella et al. | 711/118 |
| 7,512,770 B2 * | 3/2009 | Kurosaki et al. | 711/213 |
| 2003/0163594 A1 | 8/2003 | Aasheim et al. | |
| 2005/0132126 A1 | 6/2005 | Lin et al. | |
| 2005/0246487 A1 | 11/2005 | Ergan et al. | |
| 2006/0069852 A1 * | 3/2006 | Aasheim et al. | 711/103 |
| 2007/0028040 A1 * | 2/2007 | Sinclair | 711/113 |
| 2007/0100852 A1 * | 5/2007 | Wang et al. | 707/100 |
| 2007/0150654 A1 | 6/2007 | Shin et al. | |

FOREIGN PATENT DOCUMENTS

| | | |
|---|---|---|
| JP | 04-213129 A | 8/1992 |
| JP | 05-011933 A | 1/1993 |
| JP | 08-077074 A | 3/1996 |
| JP | 10-154101 A | 6/1998 |
| JP | 11-053261 A | 2/1999 |

(Continued)

*Primary Examiner*—Shane M Thomas
(74) *Attorney, Agent, or Firm*—Sughrue Mion, PLLC

(57) ABSTRACT

Provided are a storage apparatus using a non-volatile memory as a cache and a method of operating the same, in which the non-volatile memory is used as the cache so as to preserve data even when electricity is interrupted. The storage apparatus using a non-volatile memory as a cache includes a main storage medium, the non-volatile memory being used as the cache of the main storage medium and having a stationary region and a non-stationary region divided according to whether data are fixed, and a block management unit managing blocks allocated in the non-volatile memory.

32 Claims, 14 Drawing Sheets

FOREIGN PATENT DOCUMENTS

| | | |
|---|---|---|
| JP | 11249968 A | 9/1999 |
| JP | 2000-227866 A | 8/2000 |
| JP | 2002175211 A | 6/2002 |
| JP | 2003-256289 A | 9/2003 |
| KR | 11-53261 A | 2/1999 |
| KR | 10-2005-0060809 A | 6/2005 |
| KR | 10-2005-0065715 A | 6/2005 |
| WO | 2004059624 A1 | 7/2004 |

* cited by examiner

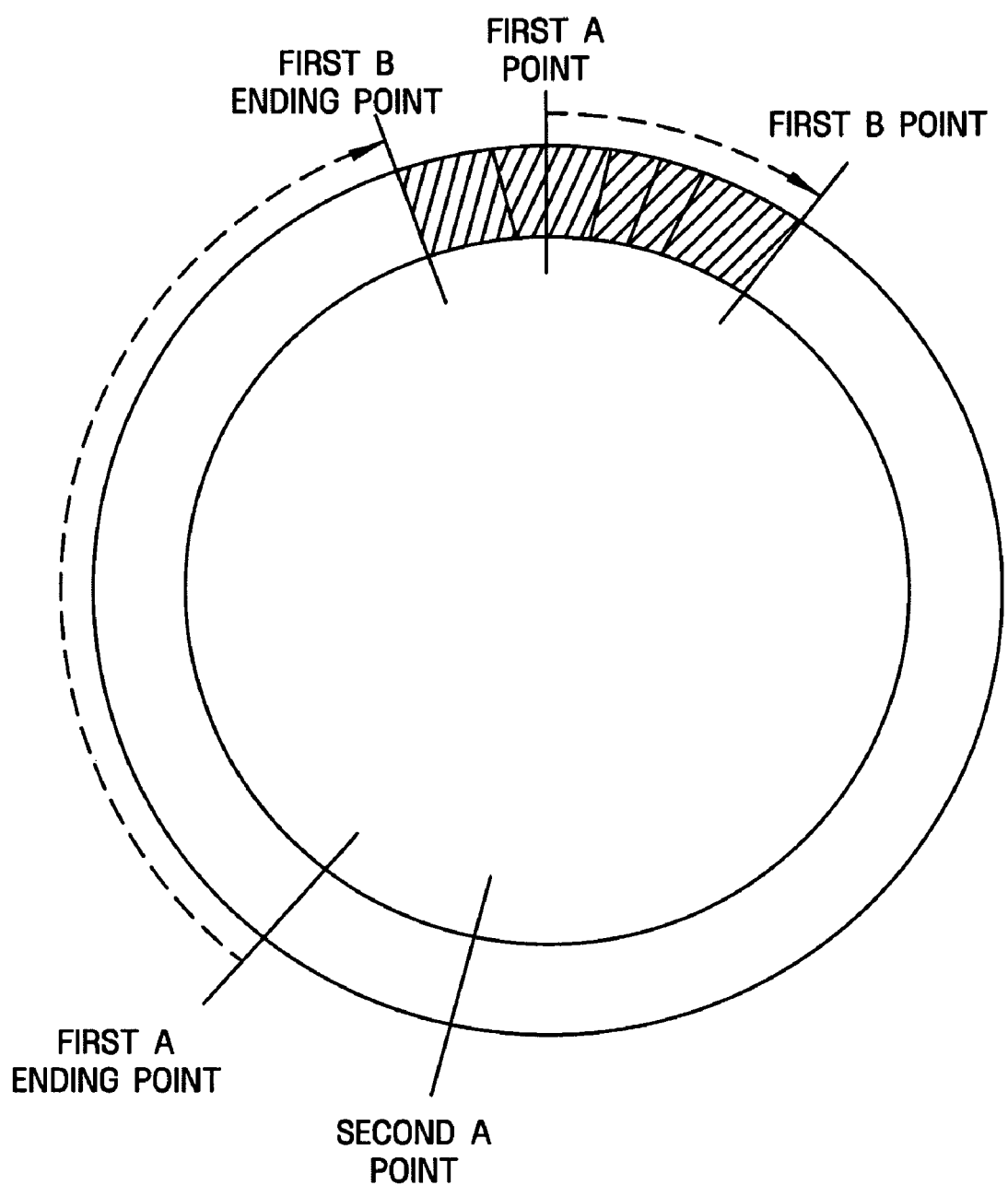

STORAGE APPARATUS AND METHOD FOR USING A NON-VOLATILE CACHE MEMORY ORGANIZED INTO STATIONARY AND NON-STATIONARY CIRCULAR REGIONS

CROSS-REFERENCE TO RELATED APPLICATION

This application claims priority from Korean Patent Application No. 10-2005-0130822 filed on Dec. 27, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to using a non-volatile memory as a cache and a method of operating the same, and more particularly, to a storage apparatus using a non-volatile memory as a cache and a method of operating the same, in which the non-volatile memory is used as the cache so as to preserve data even when electricity is interrupted.

2. Description of the Related Art

A general storage apparatus 10 includes a host 11, a data buffer (cache) 12, and a main storage medium 13, as shown in FIG. 1. The host 11 transmits data to and receives data from the main storage medium 13 according to a user's instructions. Generally, a memory smaller and faster than the main storage medium 13 is used as the data buffer 12 in order to buffer the difference of velocities between the host 11 and the main storage medium 13 and increase the access efficiency of the storage apparatus. The data is not directly recorded on the storage medium 13 which has a slow processing velocity, rather the data is recorded on the data buffer 12 which has a fast processing velocity. Accordingly, the recording speed can be improved. Further, some data in the main storage medium 13 is in advance moved into the data buffer 12, so as to improve reading speed.

That is, the data transmitted from the host 11 are stored in the data buffer 12 until the data are recorded on the main storage medium 13, while the data transmitted from the main storage medium 13 are stored in the data buffer 12 before the data are transmitted to the host 11. In the storage apparatus 10, a volatile memory is generally used as the data buffer 12. Therefore, when the electricity supplied to the storage apparatus is interrupted, all the data present in the data buffer 12 disappear. If the data buffer is increased in order to improve the access efficiency, the quantity of data lost due to the power interruption also increases. Further, since electricity is always supplied to the main storage medium 13 in order to decrease the loss of data, there is difficulty in reducing the consumption of electricity.

In order to solve the above-mentioned problem, a non-volatile memory has been recently used as a cache in a storage apparatus 10. Accordingly, while the host 11 reads data from and writes data onto the non-volatile memory, the supply of electricity to the main storage medium 13 is interrupted so that the consumption of electricity can be reduced.

However, when using the non-volatile memory as the cache of the storage apparatus 10, it has been required to effectively manage the data in a stationary region of the non-volatile memory in which predetermined data are always located and a non-stationary region in which data are frequently recorded and erased, and to safely protect data when the electricity is suddenly interrupted. Further, it has been required to retrieve blocks in order to reduce time for supplying electricity to the main storage medium 13, and to increase lifetime of the non-volatile memory in consideration of the wear level of each physical block in the non-volatile memory.

Japanese Laid-open Patent Publication 2003-256289 discloses a flash memory system capable of assigning addresses. The flash memory system has blocks partitioned therein, and periodically allocates and deletes the blocks according to a circular sequence (allocating and deleting of the blocks is carried out at the lowest and highest addresses among physical sector addresses), thereby maintaining coherence of wear level thereof. However, the above-mentioned publication does not disclose methods of effectively managing the data in the stationary and non-stationary regions, protecting the data when electricity is suddenly interrupted, retrieving the blocks and extending the lifetime of the flash memory system by adjusting the wear level of the memory system.

SUMMARY OF THE INVENTION

The present invention provides a storage apparatus using a non-volatile memory as a cache and a method of operating the same, which can separate and manage the data stored in the non-volatile memory used as the cache, and safely recover the data when power supply is suddenly interrupted.

The present invention also provides a storage apparatus using a non-volatile memory as a cache and a method of operating the same, which can allocate and retrieve blocks in the non-volatile memory used as the cache, and increase lifetime of the non-volatile memory in consideration of the wear level of the non-volatile memory.

According to an aspect of the present invention, there is provided a storage apparatus using a non-volatile memory as a cache, the storage apparatus including a main storage medium, the non-volatile memory used as the cache of the main storage medium, and comprising a stationary region and a non-stationary region divided according to whether data are fixed, and a block management unit which manages blocks allocated in the non-volatile memory.

The block management unit converts and manages the stationary and non-stationary regions of the non-volatile memory into a circular configuration in which two points are set to distinguish the stationary region and the non-stationary region from each other. Here, the two points comprises a starting first point at which the allocation of the blocks starts in the stationary and non-stationary regions, and an ending second point at which the allocation of the blocks ends.

According to another aspect of the present invention, there is provided a method of operating a storage apparatus, the method comprising dividing a non-volatile memory used as a cache in the storage apparatus into a stationary region and a non-stationary region according to whether data are fixed, and managing blocks allocated to the stationary and non-stationary regions.

BRIEF DESCRIPTION OF THE DRAWINGS

The above and other aspects of the present invention will be more apparent from the following detailed description of exemplary embodiments taken in conjunction with the accompanying drawings, in which:

FIG. 5C is a view showing the regions of the non-volatile memory according to an exemplary embodiment of the present invention, in which the activated data are sequentially moved to a point beginning from the first B point to a first B ending point in a block when the blocks in the stationary region are retrieved;

DETAILED DESCRIPTION OF EXEMPLARY EMBODIMENTS

Figure 1:
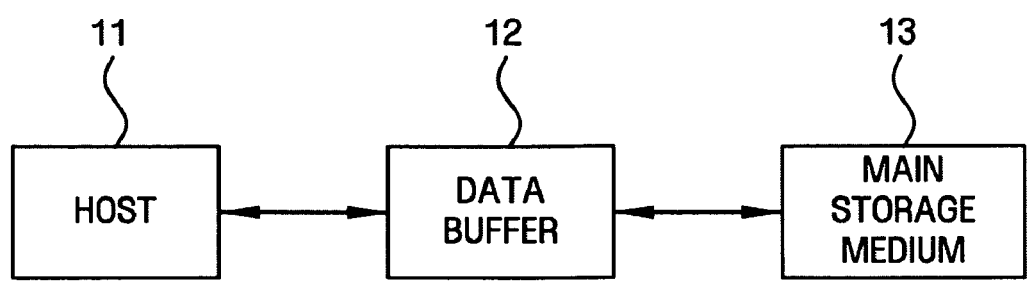
FIG. 1 is a block diagram illustrating a related art storage apparatus.

Reference will now be made in detail to exemplary embodiments of the present invention, examples of which are illustrated in the accompanying drawings.

Aspects of the present invention, and ways to achieve them will be apparent from exemplary embodiments of the present invention as will be described below together with the accompanying drawings. However, the scope of the present invention is not limited to such exemplary embodiments and the present invention may be realized in various forms. The exemplary embodiments to be described below are nothing but the ones provided to bring the disclosure of the present invention to perfection and assist those skilled in the art to completely understand the present invention. The present invention is defined only by the scope of the appended claims. The same reference numerals are used to designate the same elements throughout the specification.

Hereinafter, a storage apparatus using a non-volatile memory as a cache and a method of operating the same according to the exemplary embodiments of the present invention will be described with reference to block diagrams and flowcharts in the accompanying drawings. It will be understood that each block of the flowcharts and combinations of the flowcharts may be implemented by computer program instructions that can be provided in a processor of a general-purpose computer, a special-purpose computer or other programmable data processing apparatus. The instructions executed by the processor of the computer or other programmable data processing device create means for implementing the functions specified in the flow block diagram. These computer program instructions may also be stored in a computer-usable or computer-readable memory that can direct a computer or other programmable data processing apparatus to function in a particular manner. The computer program instructions stored in the computer-usable or computer-readable memory can produce an article of manufacture, including instruction means that implement the functions specified in the blocks of the flowcharts. The computer program instructions may also be loaded onto a computer or other programmable data processing apparatus so as to cause a series of operational steps to be performed on the computer or another programmable apparatus. The computer program instructions executed on the computer or other programmable apparatus produce a computer-based process and thereby provide steps for implementing the functions specified in the blocks of the flowcharts.

Each block in the flowcharts may represent a part of modules, segments, or codes, which comprises one or more executable instructions for implementing the specified logical function(s). It should also be noted that in some alternative implementations, the functions noted in the blocks may occur out of order. For example, two blocks shown in succession may in fact be executed substantially and concurrently or the blocks may be executed in the reverse order, depending on the functionality involved.

Figure 2:
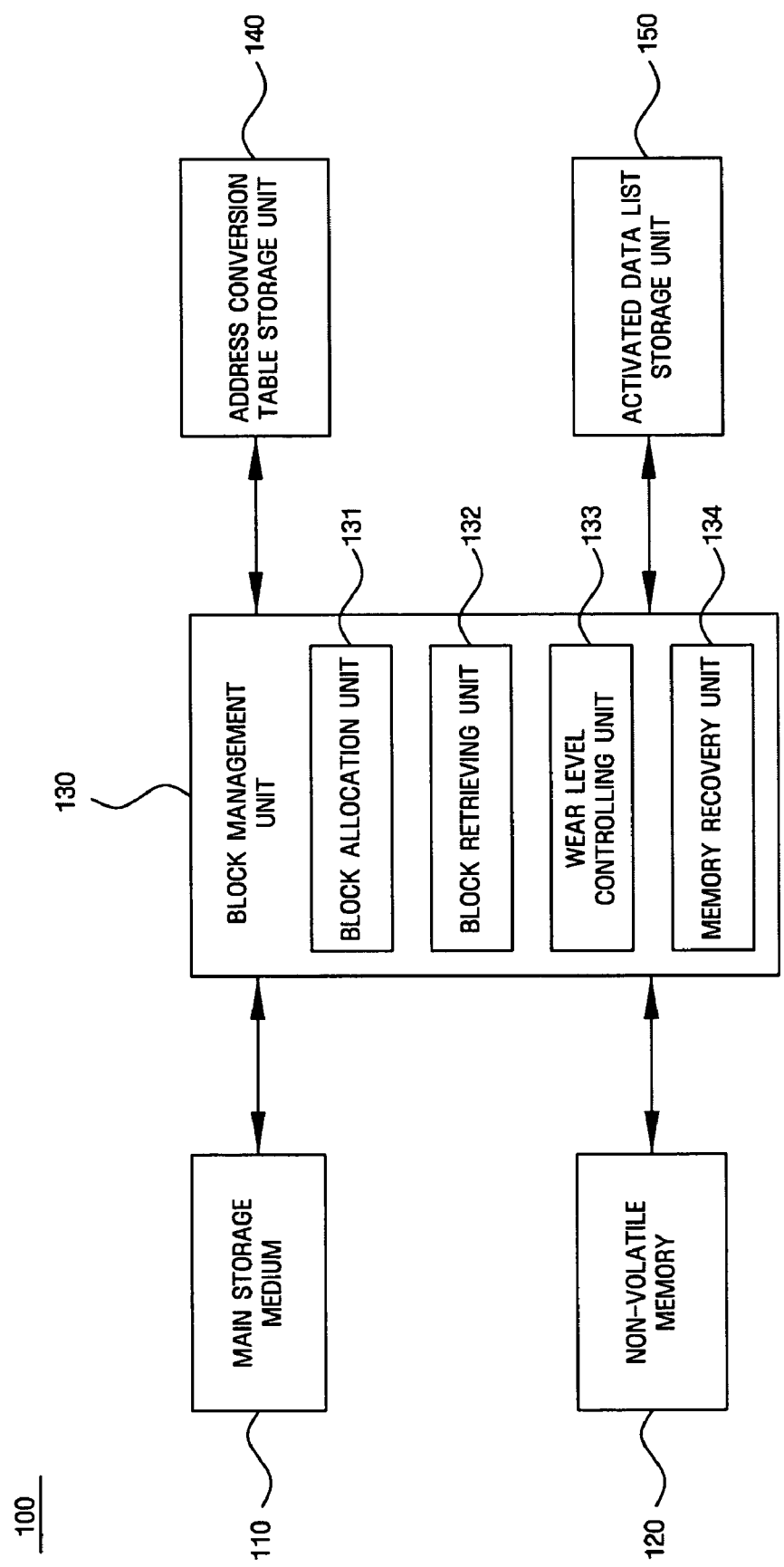
FIG. 2 is a block diagram illustrating a storage apparatus using a non-volatile memory as a cache according to an exemplary embodiment of the present invention.

FIG. 2 is a block diagram illustrating a storage apparatus using a non-volatile memory as a cache according to an exemplary embodiment of the present invention.

As shown in FIG. 2, the storage apparatus 100 using the non-volatile memory as a cache according to the exemplary embodiment of the present invention includes a main storage medium 110, a non-volatile memory 120, a block management unit 130, an address-conversion table storage unit 140, and an activated data list storage unit 150.

The main storage medium 110 refers to a large-capacity storage medium such as a hard disk drive, and the non-volatile memory 120 refers to a flash memory used as the main storage medium 110.

In the exemplary embodiment of the present invention, a flash memory will be described as an example of the non-volatile memory 120. Further, the non-volatile memory 120, which has a stationary region in which data are permanently stored and a non-stationary region in which data are temporarily stored, will be described. Here, if necessary, the capacity of the stationary region and the non-stationary region in the non-volatile memory 120 may be changed according to the use thereof.

The block management unit 130 includes a block allocation unit 131, a block retrieving unit 132, a wear level control unit 133, and a memory recovery unit 134.

Figure 3:
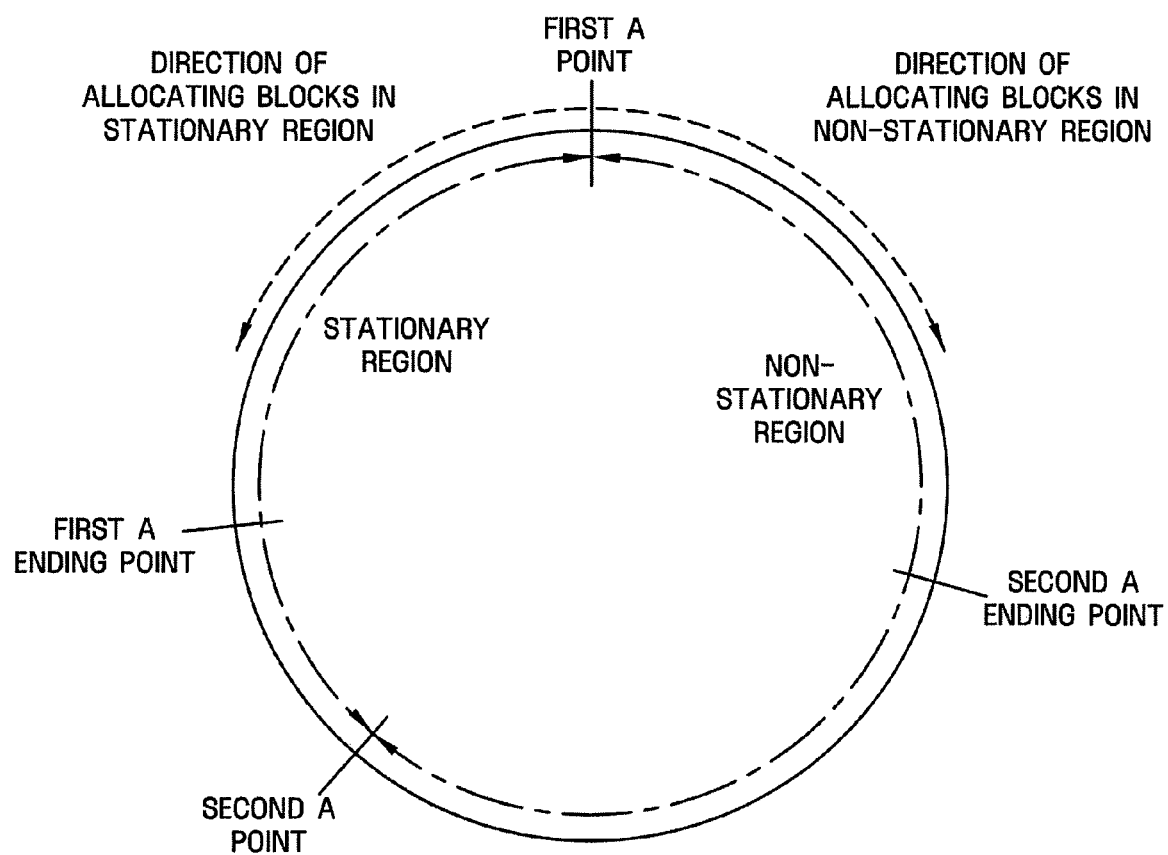
FIG. 3 is a view showing regions of the non-volatile memory converted in a circular formation according to an exemplary embodiment of the present invention.

The block allocation unit 131 allocates blocks to the stationary and non-stationary regions. The block allocation unit 131 may convert the regions of the non-volatile memory 120 into a circular formation, and then allocates the blocks to the regions. Specifically, the block allocation unit 131 converts the regions of the non-volatile memory 120 into the circular formation as shown in FIG. 3, and sets a first A point and a second A point in order to distinguish the stationary region and the non-stationary region from each other in the converted circular formation. At this time, the first A point means a point at which each region starts, and the second A point means a point at which each region is ended. The block allocation unit 131 can sequentially allocate the blocks from the first A point. Therefore, it is understood that the blocks are sequentially allocated to the stationary region and the non-stationary region in an opposite direction based on the first A point.

Further, the block allocation unit 131 can control the position in which the blocks are finally allocated to a region. In the exemplary embodiment of the present invention, positions at which the blocks are finally allocated to the stationary and non-stationary regions, are referred to as a first A ending point and a second A ending point, respectively. Furthermore, pointers indicating the positions of first blocks on which the activated data are located in the stationary and non-stationary regions, are referred to as a first A starting point and a second A starting point, respectively. In other words, since activated data may be located starting from a certain point in each region other than the first A point, the first A starting point and the second A starting point are used in order to indicate the positions of the first blocks on which the activated data are located.

Whenever electricity is regularly interrupted, the block allocation unit 131 stores the first A point, the second A point, the first A starting point, the second A starting point, the first A ending point, and the second A ending point in a desired region of the non-volatile memory 120. Henceforward, even if electricity is unexpectedly interrupted, the block allocation unit 131 can recover those points. In the present invention, the non-volatile memory, in which the first A point, the second A point, the first A starting point, the second A starting point, the first A ending point, and the second A ending point are stored in a certain block, will be described as an example.

Figure 4:
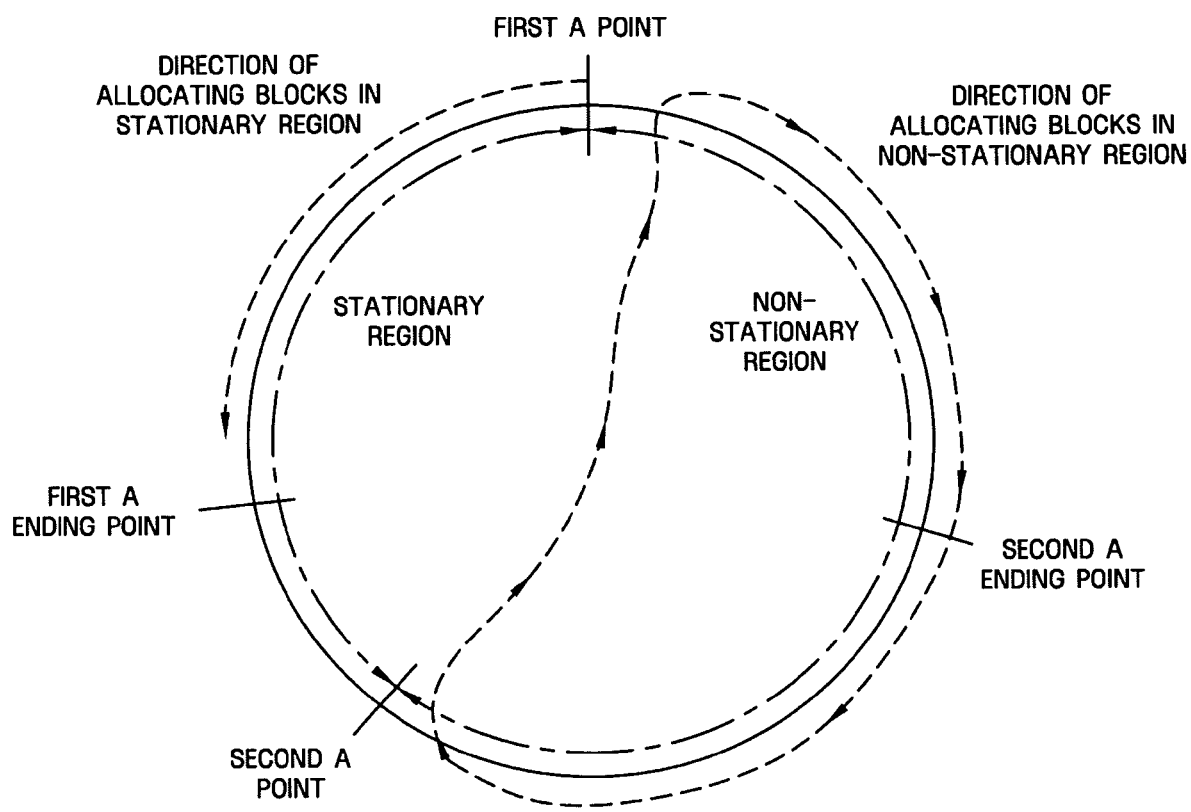
FIG. 4 is a view showing a non-stationary region allocated in a rotary block shape according to an exemplary embodiment of the present invention.

In consideration of the higher wear level of the blocks in the non-stationary region, as opposed to that of those in the stationary region, the block allocation unit 131 can allocate the blocks to the non-stationary region in a rotating way. As shown in FIG. 4, specifically, if the second A ending point is adjacent to or coincident with the second A point in the non-stationary region, the block allocation unit 131 moves the second A ending point to the first A point so as to allocate the blocks in a rotating way. At this time, when the activated data are located on the block of the first A point in the non-stationary region, the block allocation unit 131 moves the data of the corresponding block to the main storage medium 110 and then allocates the blocks.

In a non-volatile memory, since new data are added to the memory without correction of existing data during updating of the data, the block retrieving unit 132 regards the existing data as non-activated data, and retrieves the block in which the non-activated data are located so as to use the block to allocate as a new block.

Block retrieving methods can be differently carried out with respect to the stationary region and the non-stationary region. First, an exemplary block retrieving method relating to the stationary region will be described in detail.

Since the data located in the stationary region is rarely moved to the main storage medium 110, retrieving the block is essential.

Figure 5A:
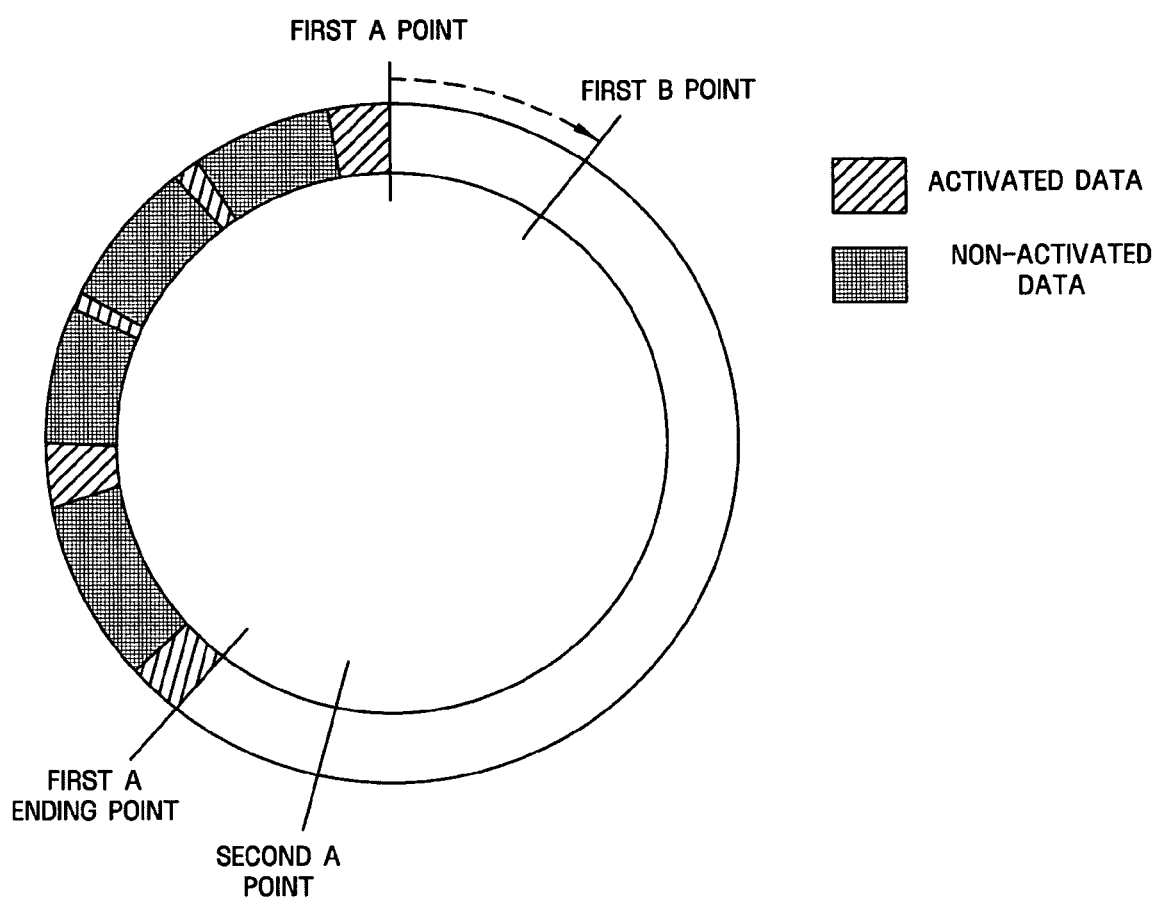
FIG. 5A is a view showing the regions of the non-volatile memory according to an exemplary embodiment of the present invention, in which a first A point moves into the non-stationary region when blocks in a stationary region are retrieved.
Figure 5B:
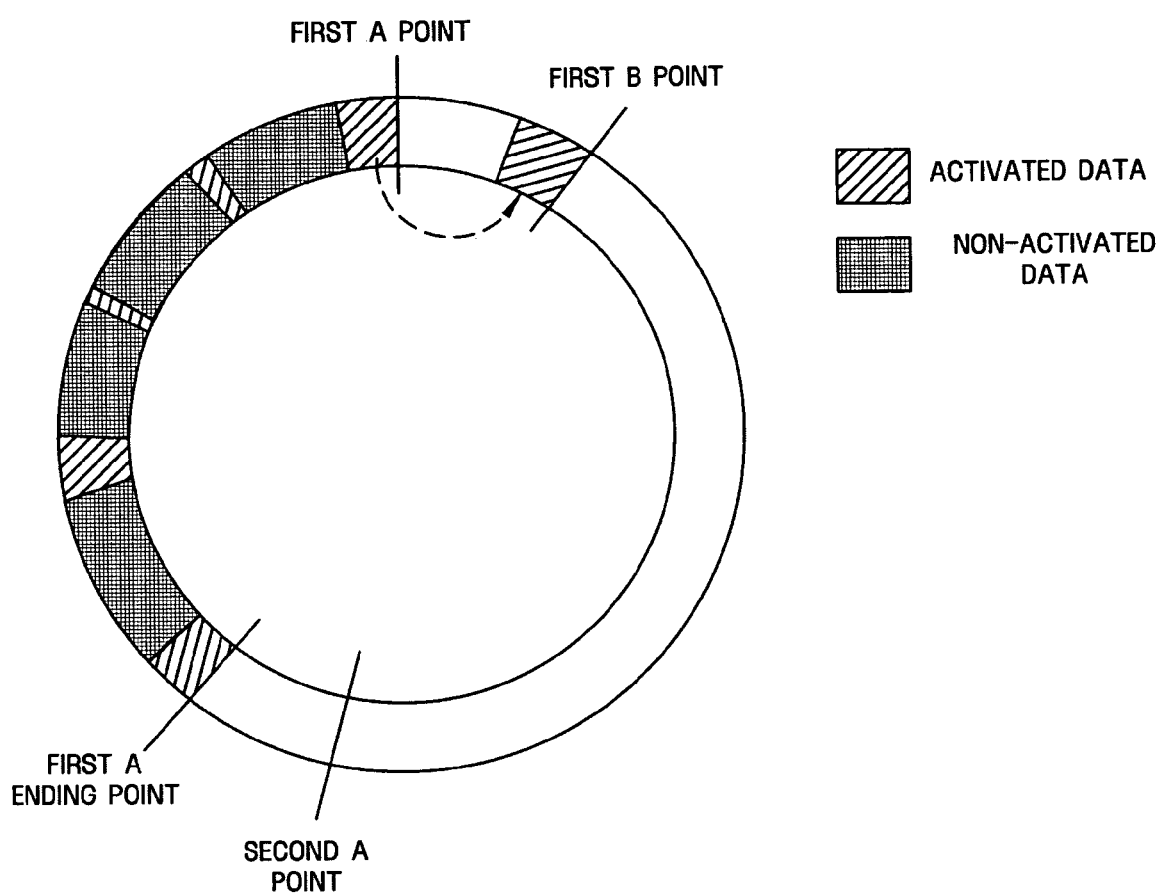
FIG. 5B is a view showing the regions of the non-volatile memory according to an exemplary embodiment of the present invention, in which activated data are moved from the first A point to a first B point when the blocks in the stationary region are retrieved.

Particularly, the block retrieving unit 132 creates a list of the activated data from an address conversion table storage unit 140 in order to retrieve the block with relation to the stationary region, and stores the created list of the activated data in an activated data list storage unit 150. At this time, only in the case where activated data exists in the block located at the first A point in the stationary region, the block retrieving unit 132 moves the first A point to a first B point in the non-stationary region by desired blocks and simultaneously moves the data in the non-stationary region to the main storage medium 110, as shown in FIG. 5A. Then, the block retrieving unit 132 moves the activated data located at the first A point to the block at the first B point, as shown in FIG. 5B. Next, the block retrieving unit 132 sequentially moves the other activated data based on the activated data list. While moving the activated data, the block retrieving unit 132 ignores non-activated data. When the movement of the activated data is completed, the block retrieving unit 132 sets the block in which the finally moved activated data are located to a first B ending point, as shown FIG. 5C. Further, the block retrieving unit 132 can set the first B point and the first B ending point to the first A point and the first A ending point, respectively, and then allocate the block.

Figure 5D:
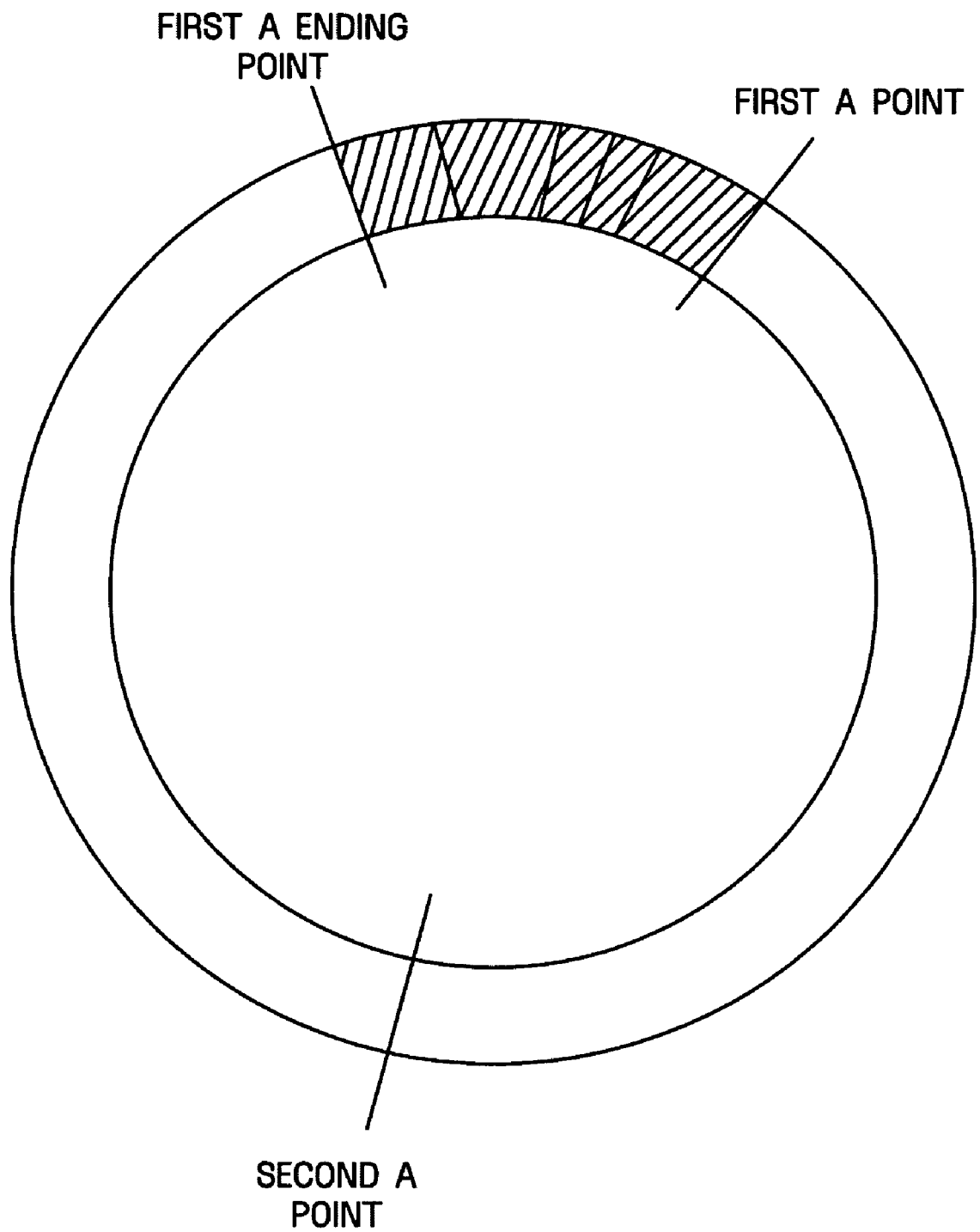
FIG. 5D is a view showing the regions of the non-volatile memory according to an exemplary embodiment of the present invention, in which the first A point moves to the first B point, and a first A ending point to the first B ending point when the blocks in the stationary region are retrieved.

It is understood that the first A point and the first A ending point are actual points at which the data are managed, and the first B point and first B ending point are points which are temporarily used for moving the activated data in the exemplary embodiment of the present invention. Additionally, in the exemplary embodiment of the present invention, as the first A point moves to the first B point, the second A point also may move to the non-stationary region as shown in FIG. 5D.

As described above, the movement of the first A point to the first B point by the block retrieving unit 132 is to balance the wear level of the stationary region and that of the non-stationary region.

Next, a block of the non-stationary region in which activated data are located is retrieved and newly allocated, so as to reduce the frequency of movement of data to the main storage medium 110. When the number of empty blocks is less than a specified number, or the number of blocks in which activated data occupy is more than a specified number, a block of the non-stationary region can be retrieved using the method of retrieving the block of the stationary region.

Specifically, in retrieving a block of the non-stationary region, as described above with relation to the block retrieving of the stationary region, the block retrieving unit 132 creates a list of activated data from the address-conversion table storage unit 140 in order to retrieve the block in the non-stationary region, and stores the activated data list in the activated data list storage unit 150.

Figure 6A:
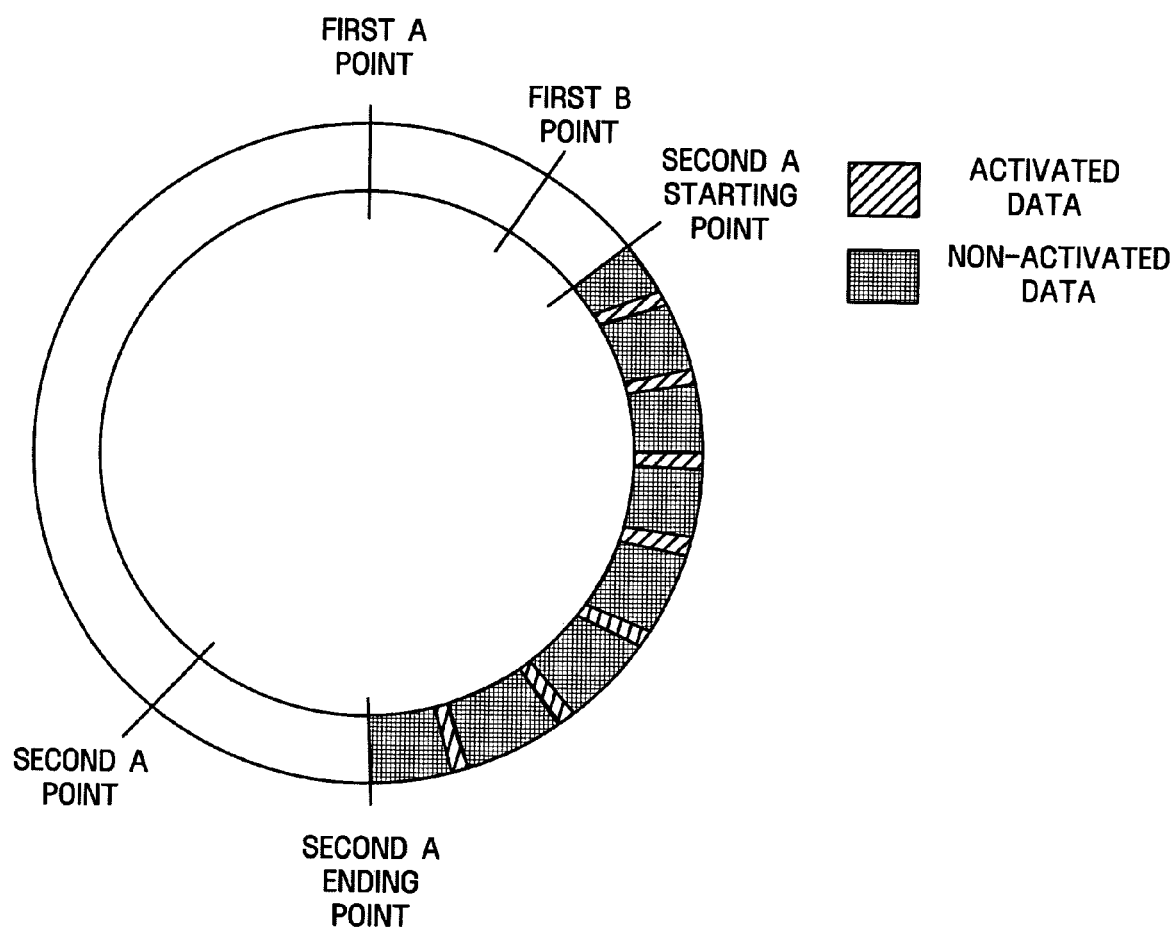
FIG. 6A is a view showing the regions of the non-volatile memory according to an exemplary embodiment of the present invention, in which a second A starting point moves to a first B point in the stationary region when the blocks in the stationary region are retrieved.
Figure 6B:
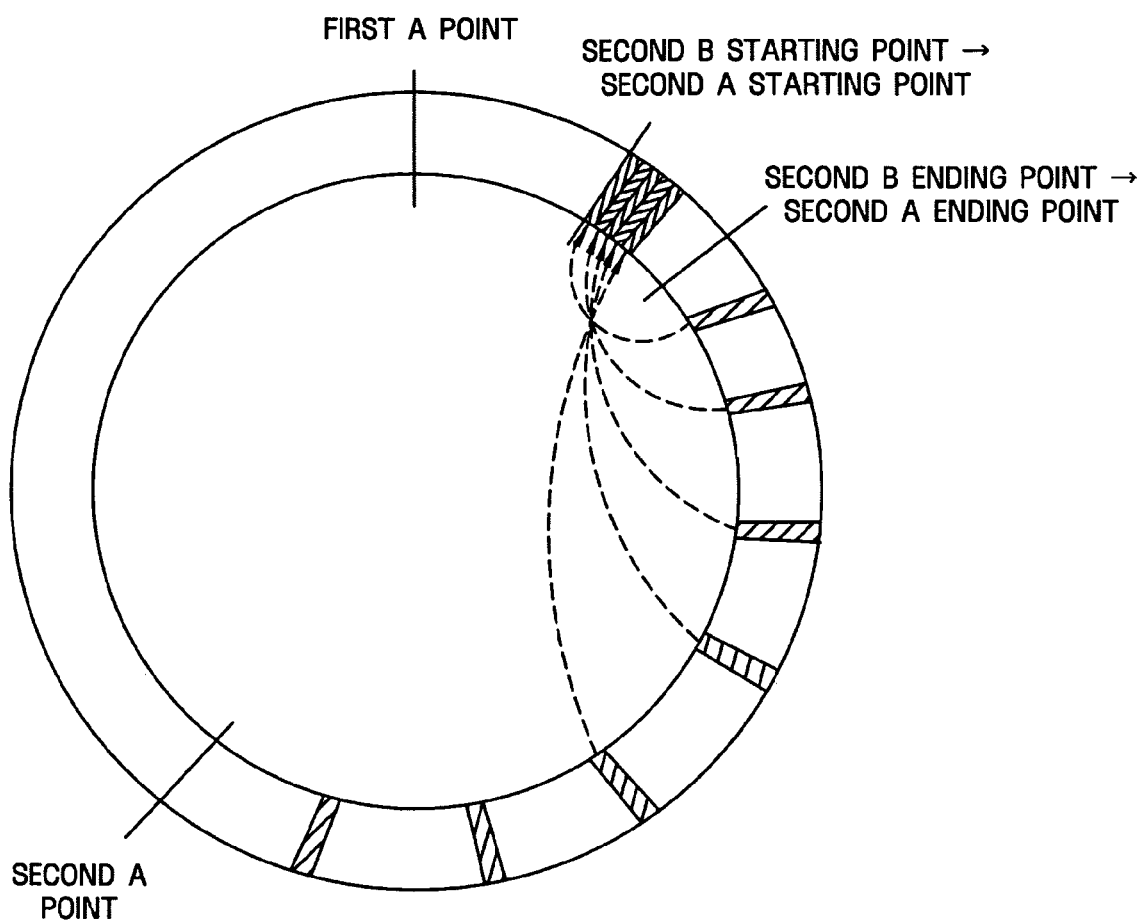
FIG. 6B is a view showing the regions of the non-volatile memory according to an exemplary embodiment of the present invention, in which the activated data are sequentially moved from the second B starting point when the blocks in the non-stationary region are retrieved.

At this time, only in the case where activated data exists in the block located at the second A starting point, the block retrieving unit 132 moves the second A starting point by desired blocks so as to set the first B point, as shown in FIG. 6A. According to an exemplary embodiment of the present invention, the above-mentioned block allocation unit 131 allocates in advance N number of empty blocks, and then additionally allocates the block. Thus, a second B starting point can be further moved to the stationary region, as compared with the second A starting point. Furthermore, the case where the second B starting point moves to the stationary region by one block in comparison with the second A starting point according to an exemplary embodiment of the present invention will be described as an example. If the first A point is coincident with the second A starting point, the data located in the N numbers of blocks are moved to the main storage medium 110.

At this time, the block retrieving unit 132 sequentially moves the data to a point beginning from the second B starting point according to the order of the activated data list, and sets a second B ending point indicating the location of the finally allocated block. Then, the block retrieving unit 132 changes the second B starting point and the second B ending point into the second A starting point and the second A ending point, respectively. At this time, information on the retrieved data is deleted from the activated data list.

Here, it is understood that while the block is retrieved from the non-stationary region, the second A starting point and the second A ending point are actually used, and the second B starting point and the second B ending point are temporarily used in order to move the activated data.

The wear level control unit 133 has information on a wear level of each block in order to balance the wear level of the blocks when the block retrieving unit 132 retrieves the blocks, and the block retrieving unit 132 retrieves the blocks in consideration of the wear level of each block stored in the wear level control unit 133. In other words, whenever a block is retrieved, the block retrieving unit 132 moves the first A starting point of the stationary region to the non-stationary region by a desired number of blocks based on the information of the wear level control unit 133 so as to carry out the block retrieval. Thus, it is possible to make the wear level of the non-stationary region equal to that of the stationary region.

The memory recovery unit 134 recovers the non-volatile memory when electricity is unexpectedly interrupted. The first A point, the second A point, the first A starting point, the first A ending point, the second A starting point, the second A ending point, and a logical block address (LBA) recorded on a spare region of each block are used to recover the non-volatile memory. The first A point and the second A point are changed and stored in a certain block of the non-volatile memory, while the first A ending point and the second A ending point record recovery marks in the next block every time the block is allocated. At this time, the memory recovery unit 134 sequentially scans the stationary region and the non-stationary region from the first A region until the recovery mark is found. In the case of identical LBA, data recorded later are extracted as activated data. When the block is corrected in the non-volatile memory 120, the existing data are not corrected, but the new block is additionally allocated to the stationary and the non-stationary regions. In the case of identical LBAs, the data written later are updated data. Then, the memory recovery unit 134 recovers the address conversion table based on the extracted data.

Figure 7:
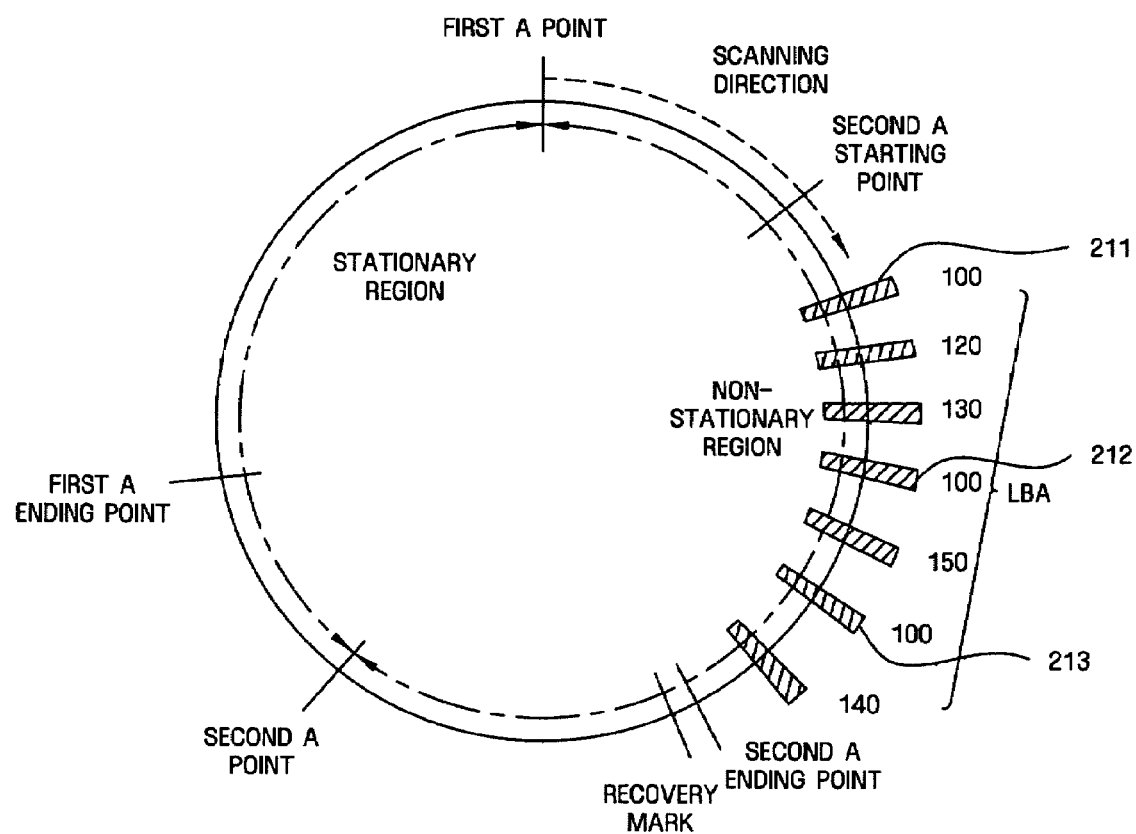
FIG. 7 is a view showing the regions of the non-volatile memory according to an exemplary embodiment of the present invention, in which a scanning direction is indicated when power failure is recovered.

The memory recovery unit 134 records the recovery mark on the block located directly next to the second A ending point in the non-stationary region, as shown in FIG. 7. At this time, if electricity is unexpectedly interrupted, the memory recovery unit 134 scans the stationary and non-stationary regions from the first A point until the recovery mark is found, and creates the address conversion table again through the LBA recorded on the above-mentioned spare region. FIG. 7 shows three blocks 211, 212, and 213 with identical LBA. The memory recovery unit 134 extracts the LBA 213 last recorded on the block as the address of the activated data.

Figure 8:
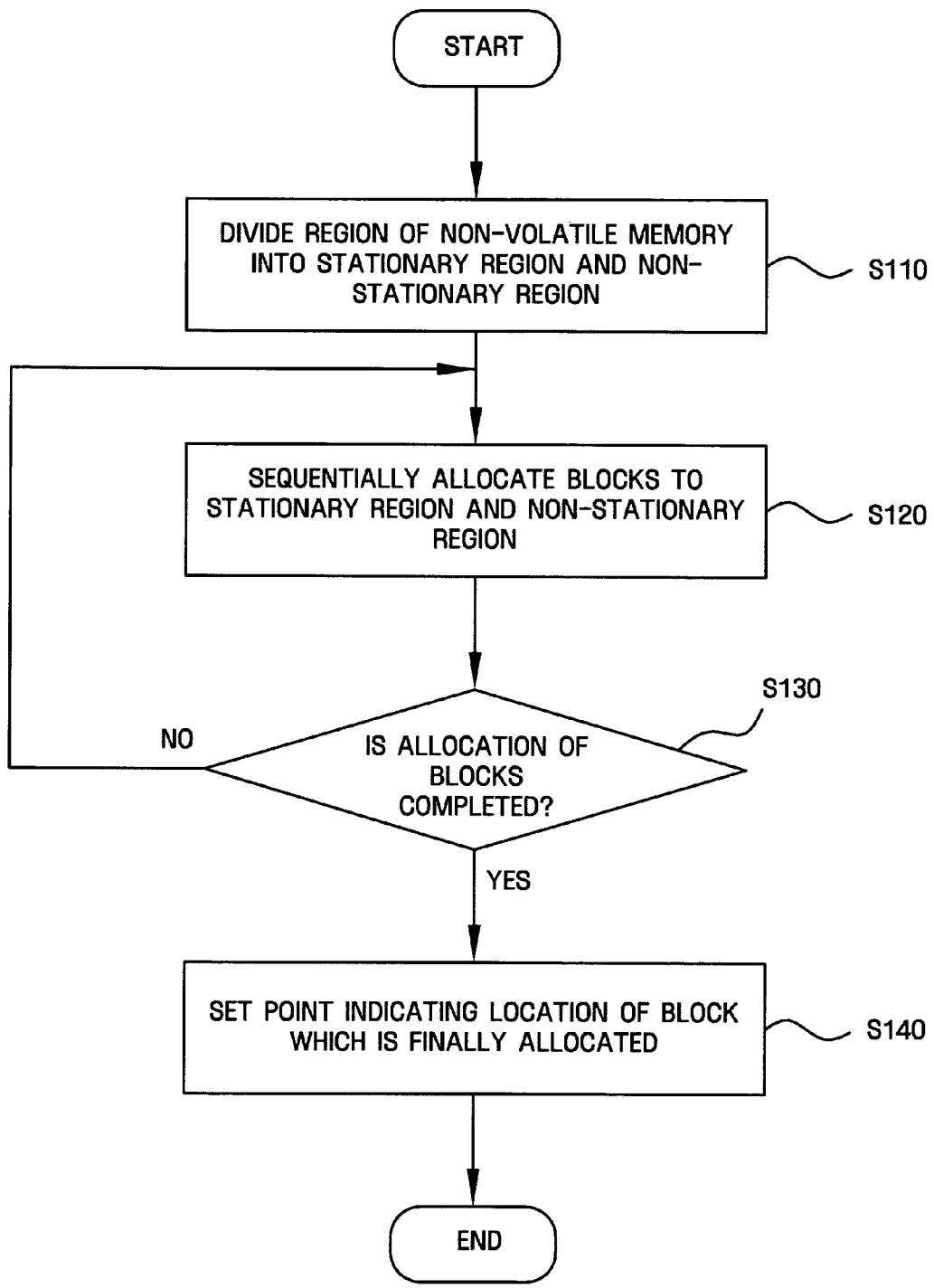
FIG. 8 is a flowchart illustrating a method of allocating the blocks of the non-volatile memory according to an exemplary embodiment of the present invention.

FIG. 8 is a flowchart illustrating a method of allocating blocks of a non-volatile memory according to an exemplary embodiment of the present invention.

As shown in FIG. 8, in the method of allocating blocks of a non-volatile memory according to an exemplary embodiment of the present invention, first the block allocation unit 131 converts the region of the non-volatile memory 120 in a circular formation, and sets the first A point and the second A point in order to divide the region of the non-volatile memory 120 into the stationary region in which data are permanently recorded and the non-stationary region which data are temporarily recorded (S110). If necessary, the capacity of the stationary and non-stationary regions divided by the first A point and the second A point may be changed according to the use thereof.

Then, the block allocation unit 131 sequentially allocates the blocks to the stationary and non-stationary regions based on the first A point (S120).

The block allocation unit 131 determines whether the allocation of blocks to the stationary and non-stationary regions is completed (S130). As a result of the determination, if the block allocation is completed, the block allocation unit 131 sets a point indicating a location at which the block is finally allocated (S140). In other words, the block allocation unit 131 sets the first A ending point and the second A ending point indicating the location of the last allocated blocks, as shown in FIG. 3. Further, the block allocation unit 131 stores the first A point, the second A point, the first A ending point, and the second A ending point, etc. in a desired region of the non-volatile memory 120 when electricity is regularly interrupted.

Figure 9:
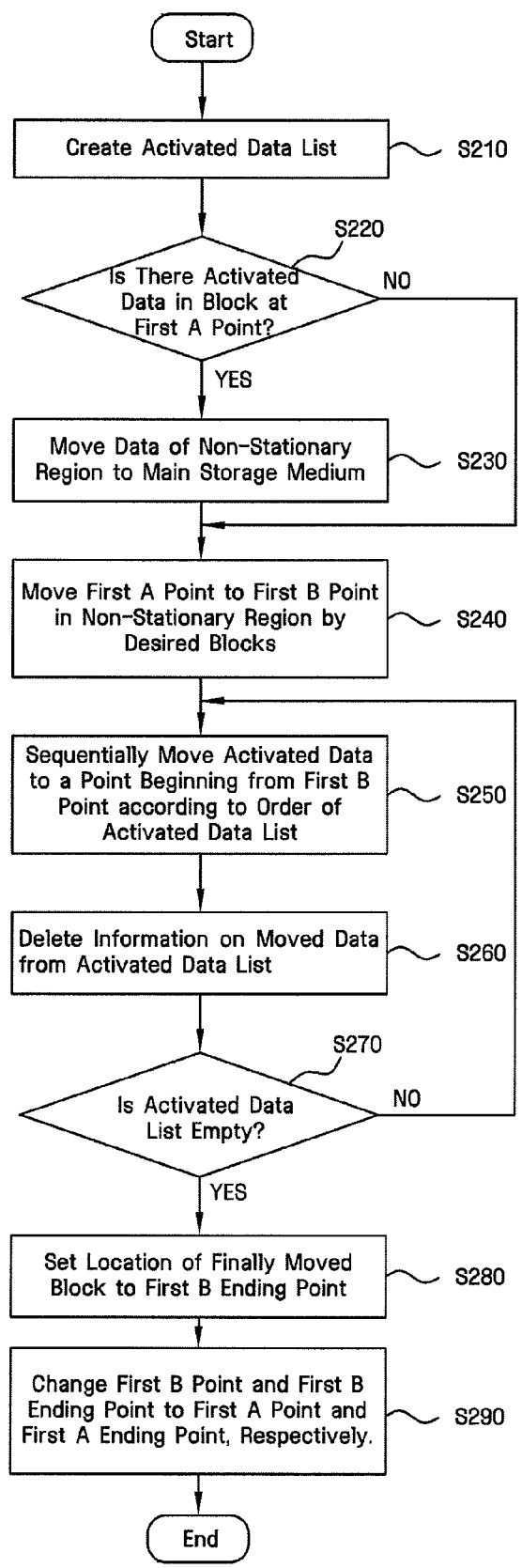
FIG. 9 is a flowchart illustrating a method of retrieving the blocks with respect to the stationary region of the non-volatile memory according to an exemplary embodiment of the present invention.

FIG. 9 is a flowchart illustrating a method of retrieving the blocks with respect to the stationary region of the non-volatile memory according to an exemplary embodiment of the present invention. The method of retrieving the block of the stationary region in FIG. 9 is apparent from the block recovery method of FIGS. 5A through 5D.

As shown in FIG. 9, in the method of retrieving the block with respect to the stationary region of the non-volatile memory according to the exemplary embodiment of the present invention, first the block retrieving unit 132 creates a list of the activated data from the address conversion table stored in the address conversion table storage unit 140, and then stores the activated data list in the activated data list storage unit 150 (S210).

Then, the block retrieving unit 132 distinguishes the stationary region and the non-stationary region from each other. If the activated data exist in the block at the first A point at which the allocation of the blocks starts (S220), the block retrieving unit 132 moves the predetermined number of blocks in the non-stationary region to the main storage medium 110 based on the first A point (S230).

After moving the data of the non-stationary region to the main storage medium 110, the block retrieving unit 132 moves the first A point to the first B point in the non-stationary region (S240). Furthermore, if the activated data do not exist in the block located at the first A point in step S220, the block retrieving unit 132 enables the first A point to be coincident with the first B point in the non-stationary region.

The block retrieving unit 132 sequentially moves the activated data to a point beginning from the first B point according to the order of the activated data list (S250) and deletes information on the activated data which have already been moved from the activated data list (S260). The block retrieving unit 132 repeatedly carries out the process of moving the activated data until the activated data list is empty and deleting the corresponding data from the activated data list (S270).

When the activated data list empties, the block retrieving unit 132 sets the block, which is finally moved, to the first B ending point (S280), and finally changes the first B point and the first B ending point to the first A point and the first A ending point, respectively (S290).

Figure 10:
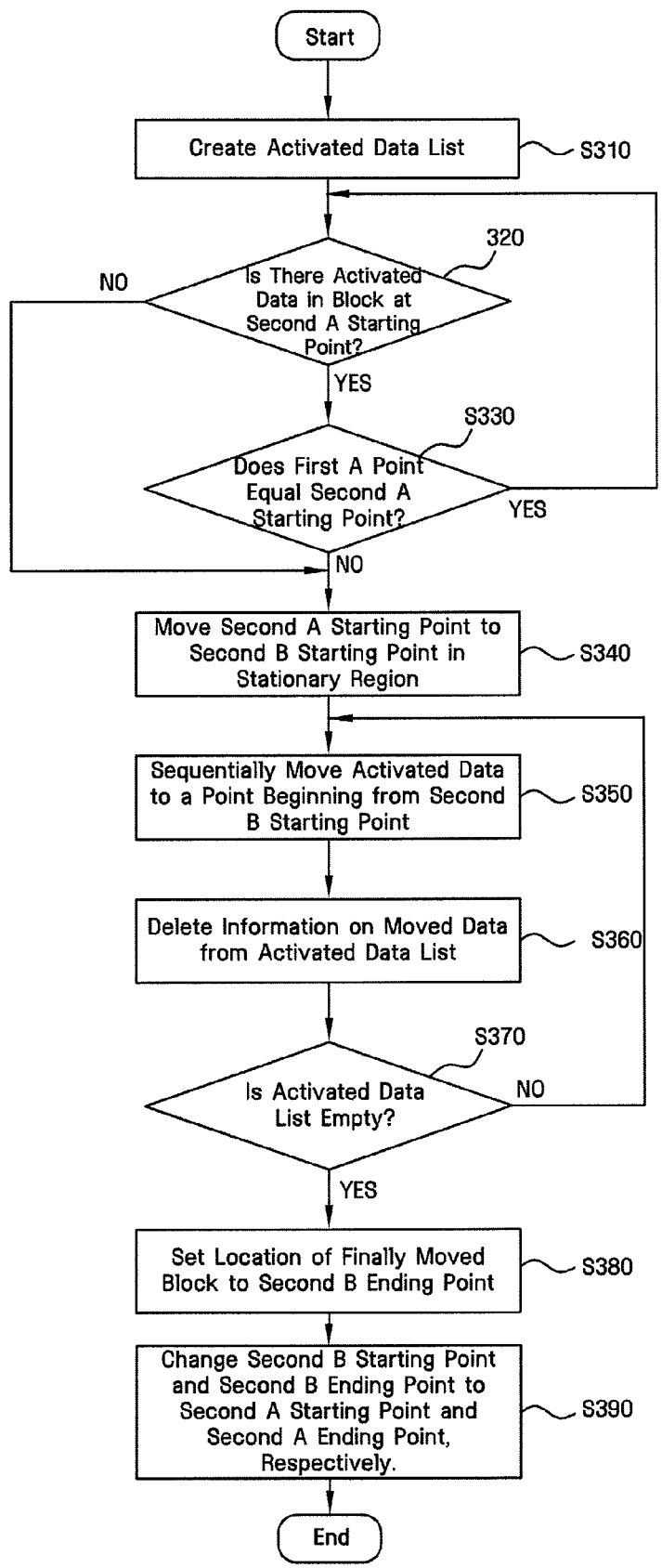
FIG. 10 is a flowchart illustrating a method of retrieving the blocks with respect to the non-stationary region of the non-volatile memory according to an exemplary embodiment of the present invention.

FIG. 10 is a flowchart illustrating a method of retrieving the blocks with respect to the non-stationary region of the non-volatile memory according to an exemplary embodiment of the present invention. The method of retrieving the block of the stationary region in FIG. 10 is apparent from the block recovery method of FIGS. 6A through 6D.

As shown in FIG. 10, in the method of retrieving the block with respect to the stationary region of the non-volatile memory according to the exemplary embodiment of the present invention, first the block retrieving unit 132 creates a list of the activated data from the address conversion table stored in the address conversion table storage unit 140, and then stores the activated data list in the activated data list storage unit 150 (S310).

Then, the block retrieving unit 132 determines whether the block that includes the activated data exists at the second A starting point (S320).

If the activated data exist at the second A starting point, the block retrieving unit 132 determines whether the first A point is coincident with the second A starting point (S330).

If the first A point is not coincident with the second A starting point, the block retrieving unit 132 moves the second A starting point to the first B point in the stationary region by the desired number of blocks (S340). Then, the block retrieving unit 132 sequentially moves the activated data to a point beginning from the second B starting point according to the order of the activated data list (S350), and deletes information on the activated data which have already been moved, from the activated data list (S360). The block retrieving unit 132 repeatedly carries out the process of moving the activated data and deleting the corresponding data from the activated data list until the activated data list is empty (S370).

When the movement of the activated data list is completed, the block retrieving unit 132 sets the location of the block, which is finally moved, to the second B ending point (S380), and finally changes the second B starting point and the second B ending point to the second A starting point and the second A ending point, respectively (S390).

The word "unit" refers to software, or a structural hardware element such as a Field Programmable Gate Array (FPGA), or an Application Specific Integrated Circuit (ASIC), which carries out a certain function. However, the unit is not limited to the software or the hardware. The unit may be arranged within a storage medium capable of addressing, or constructed to implement one or more processors. Accordingly, as an example, the unit includes structural elements such as software structure elements, object-oriented software structure elements, class structure elements and task structure elements, processes, functions, attributes, procedures, subroutines, segments of program code, drivers, firmware, microcode, circuits, data, databases, data structures, tables, arrays, and parameters. The functions provided by the structural elements and the units are combined with the small number of the structural elements and the units, or provided to additional structural elements and the units.

The storage apparatus using the non-volatile memory as the cache and the method of operating the same according to the exemplary embodiments of the present invention as described above have one or more aspects as follows:

It is possible to separate and manage the data stored in the non-volatile memory including the stationary region and the non-stationary region, thereby effectively managing the non-volatile memory used as the cache.

Furthermore, it is possible to increase the lifetime of the non-volatile memory in consideration of the wear level and the number of blocks in the stationary and non-stationary regions.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A storage apparatus comprising:
   a main storage medium;
   a non-volatile memory which operates as a cache of the main storage medium, the non-volatile memory comprising a stationary region and a non-stationary region, which are divided according to whether data are fixed; and
   a block management unit which manages blocks allocated in the non-volatile memory,
   wherein the block management unit comprises a block allocation unit which sequentially allocates the blocks to the stationary region and the non-stationary region in opposite directions of a circular configuration, and
   wherein the block management unit converts and manages the stationary and non-stationary regions of the non-volatile memory into the circular configuration in which a first point and a second point are set to distinguish the stationary region and the non-stationary region from each other.

2. The storage apparatus of claim 1, wherein allocation of the blocks starts in the stationary and non-stationary regions at the first point, and the allocation of the blocks ends at the second point.

3. The storage apparatus of claim 2, wherein the first point coincides with a point which indicates a block where activated data is firstly located, or a point which indicates the stationary and non-stationary regions start in opposite directions on the circular configuration.

4. The storage apparatus of claim 2, wherein the block management unit further comprises:
   a block retrieving unit which retrieves allocated blocks;
   a control unit which controls a wear level of the blocks in the non-volatile memory; and
   a memory recovery unit which recovers the non-volatile memory when a supply of electricity is interrupted.

5. The storage apparatus of claim 4, wherein the block retrieving unit moves the first point at which the allocation of the blocks starts in the stationary region to the non-stationary region by a number of blocks and sequentially moves activated data when blocks that contain non-activated data are retrieved from the stationary region.

6. The storage apparatus of claim 5, wherein the block retrieving unit moves the second point so that the second point indicates a position of a block lastly allocated into a position to which the block finally moves when the blocks that contain non-activated data are retrieved.

7. The storage apparatus of claim 6, wherein the block retrieving unit moves the first point at which the allocation of the blocks starts in the stationary region only if activated data exists in a block located at the first point at which the allocation of the blocks starts in the stationary region.

8. The storage apparatus of claim 4, wherein the block retrieving unit moves the first point at which the allocation of the blocks starts in the non-stationary region to the stationary region by a number of blocks and sequentially moves activated data when blocks that contain non-activated data are retrieved from the non-stationary region.

9. The storage apparatus of claim 8, wherein the block retrieving unit moves the second point so that the second point indicates a position of a block lastly allocated into a position to which the block finally moves when the blocks that contain non-activated data are retrieved.

10. The storage apparatus of claim 9, wherein the block retrieving unit moves the first point at which the allocation of the blocks starts in the non-stationary region only if activated data exists in a block located at the first point at which the allocation of the blocks starts in the non-stationary region.

11. The storage apparatus of claim 4, wherein the memory recovery unit records a recovery mark next to the second point to which a block is lastly allocated in the stationary and non-stationary regions.

12. The storage apparatus of claim 11, wherein the memory recovery unit sequentially scans the stationary and non-stationary regions from the first point until the recovery mark is found.

13. The storage apparatus of claim 12, wherein the memory recovery unit generates a desired block through scanning so as to create an address-conversion table through a logic block address (LBA) corresponding to the desired block.

14. The storage apparatus of claim 13, wherein if blocks having an identical LBA exist, the memory recovery unit determines that data in a lastly used block among the blocks having the identical LBA is an activated data.

15. The storage apparatus of claim 1, wherein the block allocation unit allocates the blocks to the non-stationary region so that the blocks circulate around the first and second points in the non-stationary region.

16. The storage apparatus of claim 1, wherein the block allocation unit sets the second point so that the second point indicates a position of a block lastly allocated when the blocks are allocated.

17. A method of operating a storage apparatus, the method comprising:
dividing a non-volatile memory used as a cache in the storage apparatus into a stationary region and a non-stationary region according to whether data are fixed; and
managing blocks allocated to the stationary and non-stationary regions,
wherein the managing blocks comprises allocating the blocks to the stationary region and the non-stationary region, and
wherein the allocating the blocks comprises sequentially allocating the blocks to the stationary region and the non-stationary region in opposite directions on a circular configuration;
converting the stationary and non-stationary regions of the non-volatile memory into the circular configuration; and
setting a first point and a second point in the circular configuration in order to distinguish the stationary and non-stationary regions from each other.

18. The method of claim 17, wherein allocation of the blocks starts in the stationary and non-stationary regions at the first point, allocation of the blocks ends at the second point.

19. The method of claim 18, wherein the first point coincides with a point which indicates a block where activated data is firstly located, or a point which indicates the stationary and non-stationary regions start in opposite directions on the circular configuration.

20. The method of claim 17, wherein the managing of the blocks further comprises:
retrieving the allocated blocks;
controlling a wear level of the blocks in the non-volatile memory; and
recovering the non-volatile memory when a supply of electricity is interrupted.

21. The method of claim 20, wherein the retrieving of the allocated blocks comprises moving the first point at which the allocation of the blocks starts in the stationary region to the non-stationary region by a number of blocks and sequentially moving activated data when the blocks that contain non-activated data are retrieved from the stationary region.

22. The method of claim 21, wherein the retrieving of the allocated blocks comprises moving the second point so that the second point indicates a position of a block lastly allocated into a position to which the block finally moves when the blocks that contain non-activated data are retrieved.

23. The method of claim 22, wherein the moving of the first point occurs only if activated data exists in a block located at the first point at which the allocation of the blocks starts in the stationary region.

24. The method of claim 22, wherein the retrieving of the allocated blocks comprises moving the first point at which the allocation of the blocks starts in the non-stationary region to the stationary region by a number of blocks and sequentially moving activated data when blocks that contain non-activated data are retrieved from the non-stationary region.

25. The method of claim 24, wherein the retrieving of the allocated blocks comprises moving the second point so that the second point indicates a position of a block lastly allocated to a position to which the block finally moves when the blocks that contain non-activated data are retrieved.

26. The method of claim 25, wherein the moving of the first point occurs only if activated data exists in a block located at the first point at which the allocation of the blocks starts in the non-stationary region.

27. The method of claim 20, wherein the recovering of the non-volatile memory comprises recording a recovery mark next to the second point to which a block is lastly allocated in the stationary and non-stationary regions.

28. The method of claim 27, wherein the recovering of the non-volatile memory comprises sequentially scanning the stationary and non-stationary regions from the first point until the recovery mark is found.

29. The method of claim 28, wherein the recovering of the non-volatile memory comprises generating a desired block through scanning so as to create an address conversion table through a logic block address (LBA) corresponding to the desired block.

30. The method of claim 29, wherein if blocks having an identical LBA exist, the recovering of the non-volatile memory comprises determining that data in a lastly used block among the blocks having the identical LBA is an activated data.

31. The method of claim 17, wherein the allocating of the blocks comprises allocating the blocks to the non-stationary region so that the blocks circulate around the first and second points in the non-stationary region.

32. The method of claim 31, wherein the allocating of the blocks comprises setting the second point so that the second point indicates a position of a block lastly allocated when the block are allocated.

* * * * *